United States Patent
DeBoer

(10) Patent No.: US 8,717,720 B2
(45) Date of Patent: May 6, 2014

(54) SYSTEMS AND METHODS FOR PROVIDING ARC FAULT AND/OR GROUND FAULT PROTECTION FOR DISTRIBUTED GENERATION SOURCES

(75) Inventor: John DeBoer, Denver, CO (US)

(73) Assignee: Siemens Industry, Inc., Alpharetta, GA (US)

(*) Notice: Subject to any disclaimer, the term of this patent is extended or adjusted under 35 U.S.C. 154(b) by 42 days.

(21) Appl. No.: 13/185,549

(22) Filed: Jul. 19, 2011

(65) Prior Publication Data
US 2012/0019966 A1 Jan. 26, 2012

Related U.S. Application Data

(60) Provisional application No. 61/365,982, filed on Jul. 20, 2010.

(51) Int. Cl.
*H02H 9/02* (2006.01)

(52) U.S. Cl.
USPC .......................................................... 361/42

(58) Field of Classification Search
USPC .......................................................... 361/42
See application file for complete search history.

(56) References Cited

U.S. PATENT DOCUMENTS

| | | | |
|---|---|---|---|
| 6,538,862 B1 * | 3/2003 | Mason et al. | 361/42 |
| 6,825,578 B2 * | 11/2004 | Perttu | 307/70 |
| 7,864,492 B2 | 1/2011 | Endozo | |
| 7,948,719 B2 | 5/2011 | Xu | |
| 2003/0111103 A1 | 6/2003 | Bower | |
| 2006/0279883 A1 | 12/2006 | Elms | |
| 2007/0008076 A1 * | 1/2007 | Rodgers et al. | 340/310.11 |
| 2007/0132531 A1 | 6/2007 | Elms | |
| 2009/0000654 A1 * | 1/2009 | Rotzoll et al. | 136/244 |
| 2009/0108967 A1 * | 4/2009 | Parker | 335/20 |
| 2009/0316448 A1 * | 12/2009 | Knaup et al. | 363/40 |
| 2011/0019444 A1 | 1/2011 | Dargatz | |
| 2011/0115301 A1 * | 5/2011 | Bhavaraju et al. | 307/86 |
| 2011/0141644 A1 | 6/2011 | Gisske | |

FOREIGN PATENT DOCUMENTS

WO    WO 2010078303 A2    7/2010

OTHER PUBLICATIONS

Wiles, John, "Photovoltaic Power Systems and the 2005 National Electrical Code: Suggested Practices", Oct. 4, 2007.*
Wiles, John, "Ground Fault Protection for PV Systems", Feb. 2008, IAEI News.*
PCT International Search Report mailed Dec. 8, 2011 corresponding to PCT International Application No. PCT/US2011/044611 filed Jul. 20, 2011.

* cited by examiner

*Primary Examiner* — Jared Fureman
*Assistant Examiner* — Kevin J Comber

(57) ABSTRACT

A system is provided including: (1) an arc fault circuit interrupter having a line side terminal and a load side terminal, wherein the line side terminal is coupled to a voltage source, and (2) a current source coupled to the load side terminal to backfeed the arc fault circuit interrupter. Numerous other aspects also are provided.

35 Claims, 8 Drawing Sheets

SYSTEMS AND METHODS FOR PROVIDING ARC FAULT AND/OR GROUND FAULT PROTECTION FOR DISTRIBUTED GENERATION SOURCES

REFERENCE TO RELATED APPLICATIONS

This application claims the benefit of U.S. Provisional Patent Application Ser. No. 61/365,982, filed Jul. 20, 2010, which is incorporated by reference herein in its entirety for all purposes.

BACKGROUND

This application relates generally to systems and methods for providing arc fault and/or ground fault protection for distributed generation sources.

In recent years, rising utility costs and growing concern regarding environmental harm caused by use of fossil fuels has spurred enhanced interest in "alternative" energy supplies, such as solar, wind, and hydroelectric power sources. In addition, as the cost of alternative energy sources has decreased, and as more electric utilities offer grid connected "net metering" programs that allow system owners to feed surplus electric power back to the electric utility, the use of alternative energy sources has increased.

In a conventional residential net metering solar system, one or more photovoltaic panels are used to convert solar energy to a DC current, and one or more inverters convert the DC current to an AC current synchronized to the magnitude, phase and frequency of the voltage signal supplied by the electric utility. In a majority of installations, the generated AC signal is then fed into the home power distribution system (e.g., a circuit breaker panel) typically by back-feeding one or more conventional circuit breakers.

A conventional circuit breaker typically is an electro-mechanical device that provides overload and short-circuit protection, but does not provide arc fault or ground fault protection. As a result, the wiring extending between the inverter and the home power distribution system is not protected against arc faults, but is capable of being subjected to such faults.

Some previously known distributed generation sources have included arc fault and/or ground fault protection at or near the power sources, which are typically located on the roof of a building or at another location far away from the electrical panel. However, such sources typically are remotely located, often in severe weather environments, that are not always easy or convenient to access. As a result, such remotely-located arc fault and/or ground fault protection devices can be difficult to reset, maintain and replace.

Accordingly, improved arc fault and/or ground fault protection for distributed generation sources is desirable.

SUMMARY

In a first aspect of the invention, a system is provided including: (1) an arc fault circuit interrupter having a line side terminal and a load side terminal, wherein the line side terminal is coupled to a voltage source, and (2) a current source coupled to the load side terminal to backfeed the arc fault circuit interrupter.

In a second aspect of the invention, a method is provided, the method including: (1) providing an arc fault circuit interrupter having a line side terminal and a load side terminal, wherein the line side terminal is coupled to a voltage source, and (2) coupling a current source to the load side terminal to backfeed the arc fault circuit interrupter.

In a third aspect of the invention, a photovoltaic system is provided including: (1) an arc fault circuit interrupter having a line side terminal and a load side terminal, wherein the line side terminal is coupled to a voltage source, and (2) an inverter coupled to the load side terminal to backfeed the arc fault circuit interrupter.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

Systems and methods in accordance with this invention backfeed an arc fault circuit interrupter to provide arc fault (and/or ground fault) protection for a distributed generation source, such as a photovoltaic system, wind power system, hydroelectric system, generator, or other similar distributed generation source.

An Arc Fault Circuit Interrupter ("AFCI") is an electrical device designed to protect against fires caused by arcing faults in damaged or deteriorated electrical wiring. In a residential setting, such damage may be caused in wiring that is punctured, pinched, deteriorated, impaired, or otherwise damaged. To prevent such damaged wiring from causing arcs that may cause fires, modern electrical codes generally require AFCI circuit breakers in all circuits that feed outlets in bedrooms of dwelling units.

Figure 1:
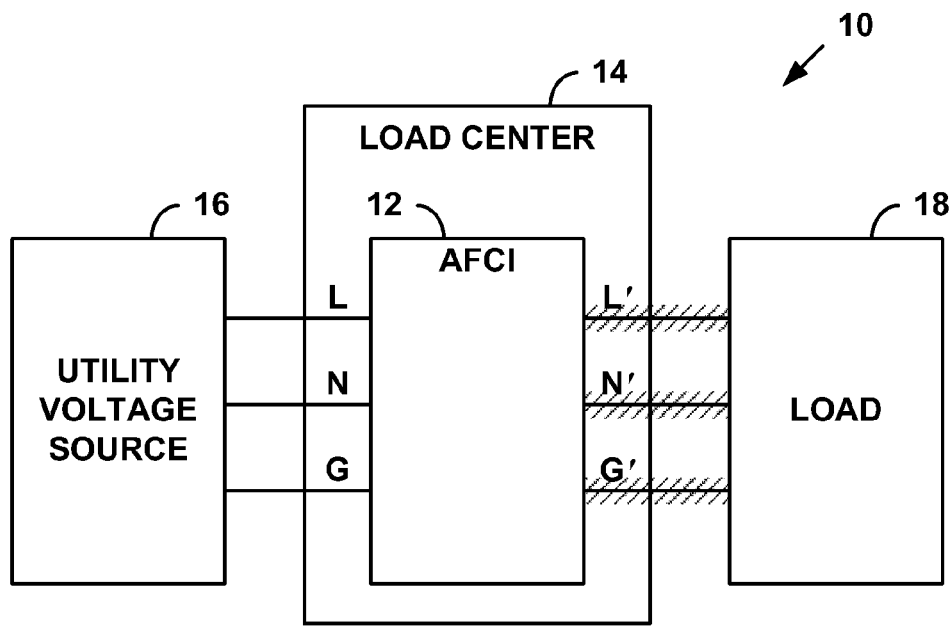
FIG. 1 is a block diagram of a previously known system including an arc fault circuit interrupter device.

For example, FIG. 1 illustrates an example of a previously known system including an AFCI circuit breaker. In particular, system 10 includes an AFCI circuit breaker 12 installed in a load center 14, such as a circuit breaker panel. For simplicity, AFCI circuit breaker 12 will be referred to as "AFCI 12." In the illustrated example, AFCI 12 is a single-pole AFCI circuit breaker. Persons of ordinary skill in the art will understand that AFCI 12 alternatively may be a two-pole AFCI circuit breaker.

AFCI 12 includes "line side" terminals L, N and G, and "load side" terminals L', N' and G'. Through conventional connections in load center 14, line side terminals L, N and G of AFCI 12 are connected to line, neutral and ground terminals of utility voltage source 16, and load side terminals L', N' and G' are connected to line, neutral and ground terminals of load 18. Utility voltage source 16 is typically provided by an electrical utility provider. Load 18 is typically the electrical branch wiring to one or more electrical outlets.

In normal operation, load side terminals L', N' and G' are connected to line side terminals L, N and G via a normally-closed switch (not shown). In this regard, load 18 is normally coupled to utility voltage source 16. As described in more detail below, AFCI 12 includes circuitry designed to detect arc faults on load side terminals L', N' and G'. If an arc fault is detected, an actuator (not shown) in AFCI 12 causes the switch to disconnect load side terminals L', N' and G' from line side terminals L, N and G, thus de-energizing the circuit, and reducing the potential for fires. Thus, in FIG. 1, load side terminals are shown in cross-hatch to indicate that the terminals are protected against arc faults.

Some AFCI devices, commonly referred to as dual function AFCI/GFCI devices, also include circuitry to detect ground faults. In such devices, if a ground fault is detected, the actuator in the AFCI devices causes the switch to disconnect load side terminals L', N' and G' from line side terminals L, N and G. Thus, such AFCI devices provide both arc fault protection and ground fault protection of load side terminals L', N' and G'.

In accordance with this invention, an AFCI is used to provide arc fault (and/or ground fault) protection for a distributed generation source, such as a photovoltaic system, wind power system, hydroelectric system, generator, or other similar distributed generation source. In particular, as described in more detail below, by back-feeding the AFCI using the distributed generation source, the AFCI may be used to provide arc fault (and/or ground fault) protection for a distributed generation source.

Figure 2:
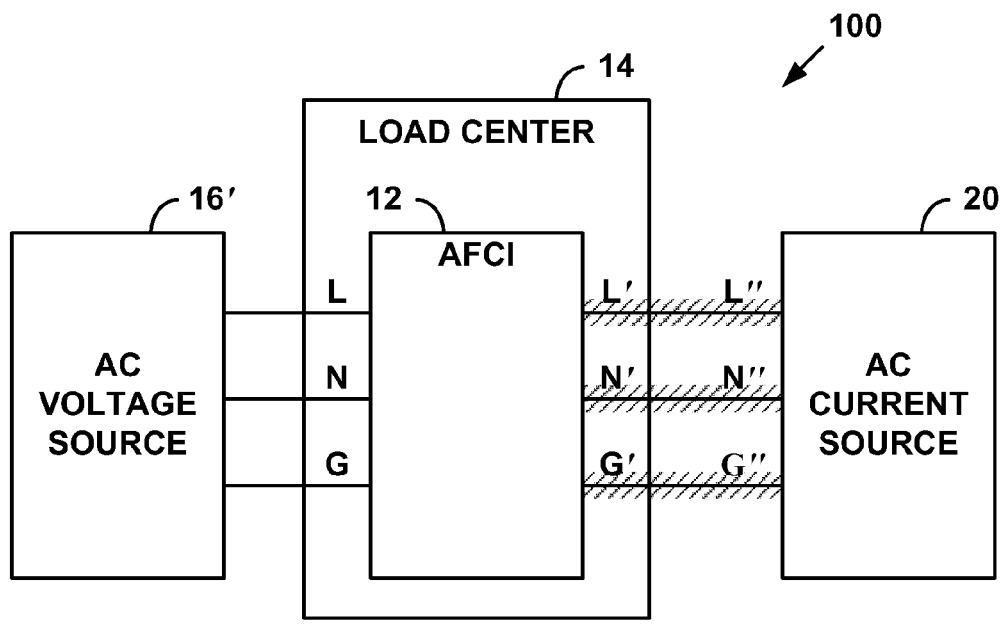
FIG. 2 is a block diagram of an example back-fed arc fault circuit interrupter system in accordance with this invention.

Referring to FIG. 2, a first example system in accordance with this invention is described. In particular, example system 100 includes AFCI 12 installed in load center 14, with line side terminals L, N and G of AFCI 12 connected to line, neutral and ground terminals of an AC voltage source 16', and load side terminals L', N' and G' connected to line (L"), neutral (N") and ground (G") terminals of AC current source 20. In this regard, AC current source 20 back-feeds AFCI 12.

AFCI 12 may be any conventional AFCI circuit breaker, such as a Q120AFC arc fault circuit interrupter circuit breaker manufactured by Siemens Industry, Inc., New York, N.Y.

AC voltage source 16' may be a utility voltage source, such as utility voltage source 16 of FIG. 1. Alternatively, AC voltage source 16' may be any other similar AC voltage source, such as a voltage source generator. For simplicity, AC voltage source 16' will be assumed to be a utility voltage source.

AC current source 20 may be a distributed generation source, such as a photovoltaic system, wind power system, hydroelectric system, generator, or any other similar distributed generation source that behaves like an AC current source.

Although AFCI 12 is shown installed in load center 14 (e.g., in a circuit breaker panel inside a building or home), persons of ordinary skill in the art will understand that AFCI 12 alternatively may be installed in other locations, such as in an electrical subpanel, combination meter socket/load center, AC junction box, AC disconnect switch, or other similar location inside or outside a building or home.

Figure 3:
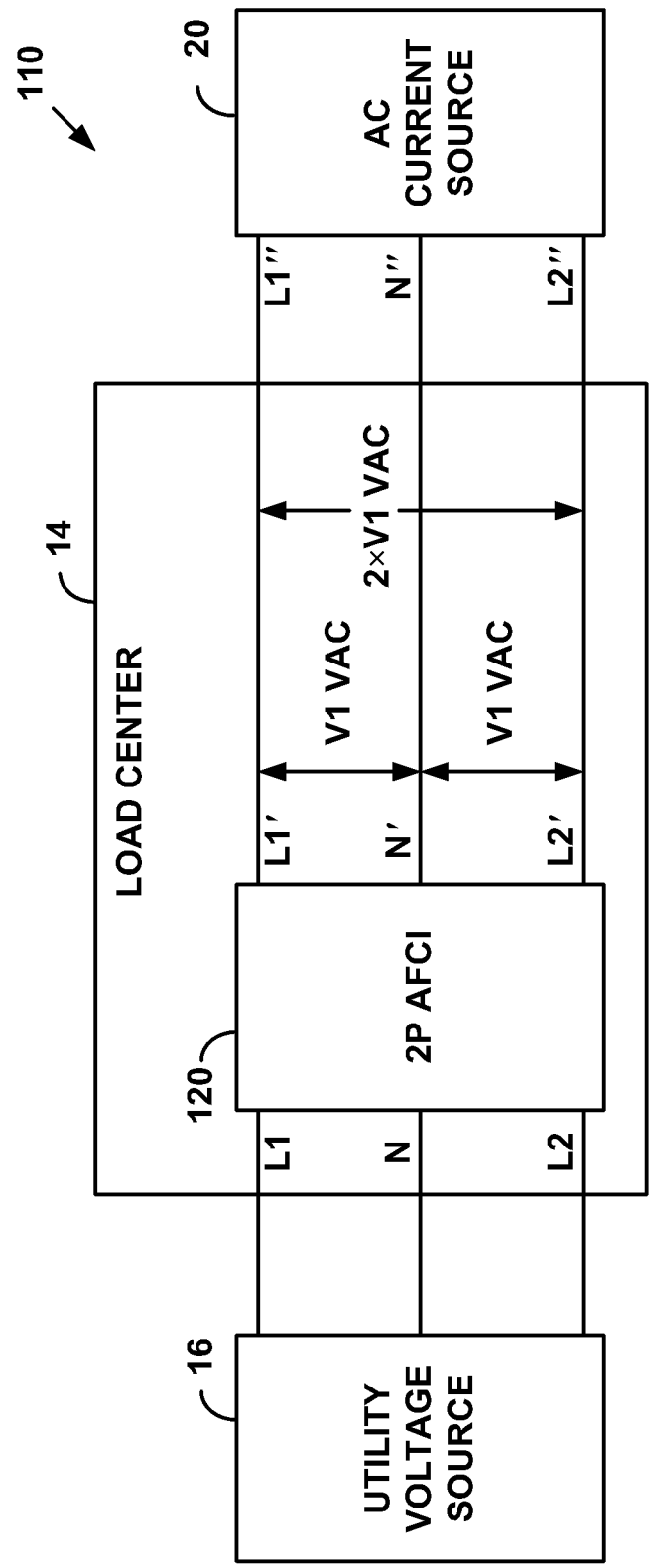
FIG. 3 is a more detailed block diagram of an example back-fed arc fault circuit interrupter system in accordance with this invention.

As mentioned above, AFCI 12 may be a single pole AFCI circuit breaker ("1P AFCI"), or a two-pole AFCI circuit breaker ("2P AFCI"). Referring now to FIG. 3, an example 2P AFCI system in accordance with this invention is described. In particular, system 110 includes a 2P AFCI 120 installed in load center 14, and having line side terminals L1, N, and L2, and load side terminals load side terminals L1', N' and L2'. For simplicity, ground terminals are not shown.

AFCI 120 may be any conventional AFCI circuit breaker, such as a Q120AFC arc fault circuit interrupter circuit breaker manufactured by Siemens Industry, Inc., New York, N.Y.

Line side terminals L1, N, and L2 are connected to line 1, neutral and line 2 terminals of utility voltage source 16, and load side terminals L1', N' and L2' are connected to line 1 (L1"), neutral (N") and line 2 (L2") terminals of AC current source 20. In this example, utility voltage source 16 and AC current source 20 are split-phase sources, with V1 VAC between L1' and neutral, V1 VAC between L2' and neutral, and 2×V1 VAC between L1' and L2'. AC current source 20 may be a photovoltaic system, wind power system, hydroelectric system, generator, or any other similar distributed generation source that behaves like a split-phase AC current source.

Figure 4A:
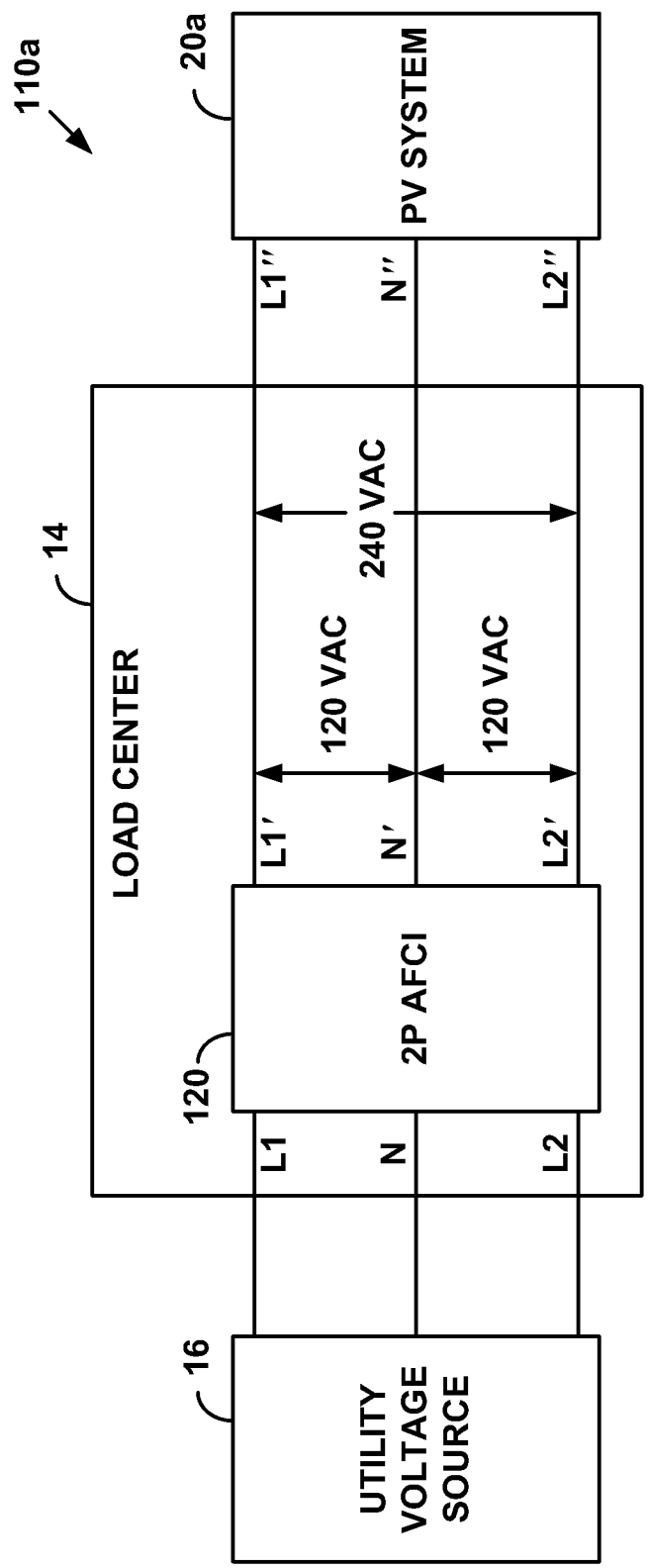
FIG. 4A is a block diagram of an alternative example back-fed arc fault circuit interrupter system in accordance with this invention.
Figure 4B:
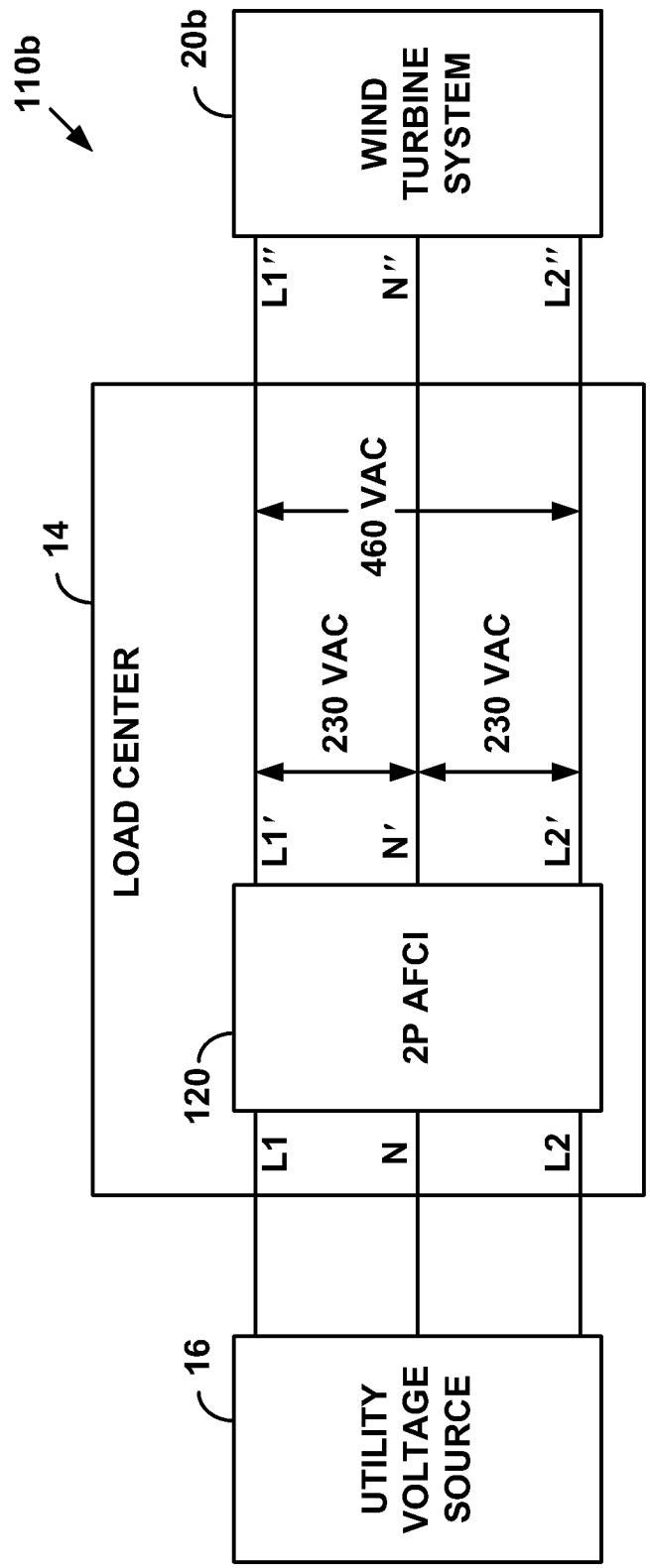
FIG. 4B is a block diagram of another alternative example back-fed arc fault circuit interrupter system in accordance with this invention.
Figure 4C:
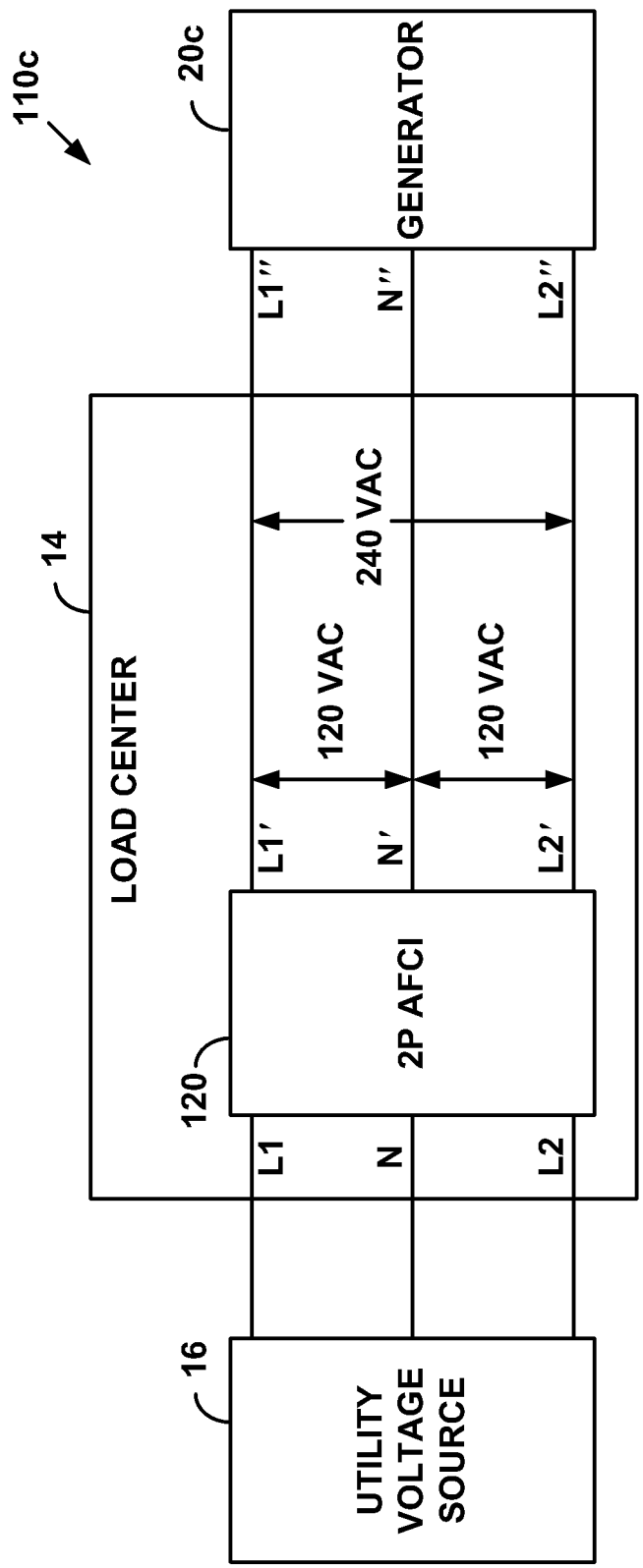
FIG. 4C is a block diagram of another alternative example back-fed arc fault circuit interrupter system in accordance with this invention.

For example as shown in FIG. 4A, example system 110a includes a photovoltaic system 20a that is a 240V/120V split-phase system, such as for use in the United States. Alternatively, as shown in FIG. 4B, example system 110b includes a wind turbine system 20b that is a 460V/230V split-phase system, such as for use in Europe. FIG. 4C illustrates yet another example system 110c that includes a current source generator 20c that is a 240V/120V split-phase system.

Persons of ordinary skill in the art will understand that systems in accordance with this invention alternatively may be scaled to include more than one distributed generation source 20 coupled to one or more AFCI circuit breakers 12/120. For example, a photovoltaic system 20a may be coupled to a 2P AFCI 120, and a wind turbine system 20b may be coupled to a 1P AFCI 12 in single load center 14. Furthermore, large renewable generation systems may be of sufficient ampacity to require multiple photovoltaic systems to be coupled to multiple AFCI circuit breakers to prevent overloading of any one electrical wire.

Figure 5:
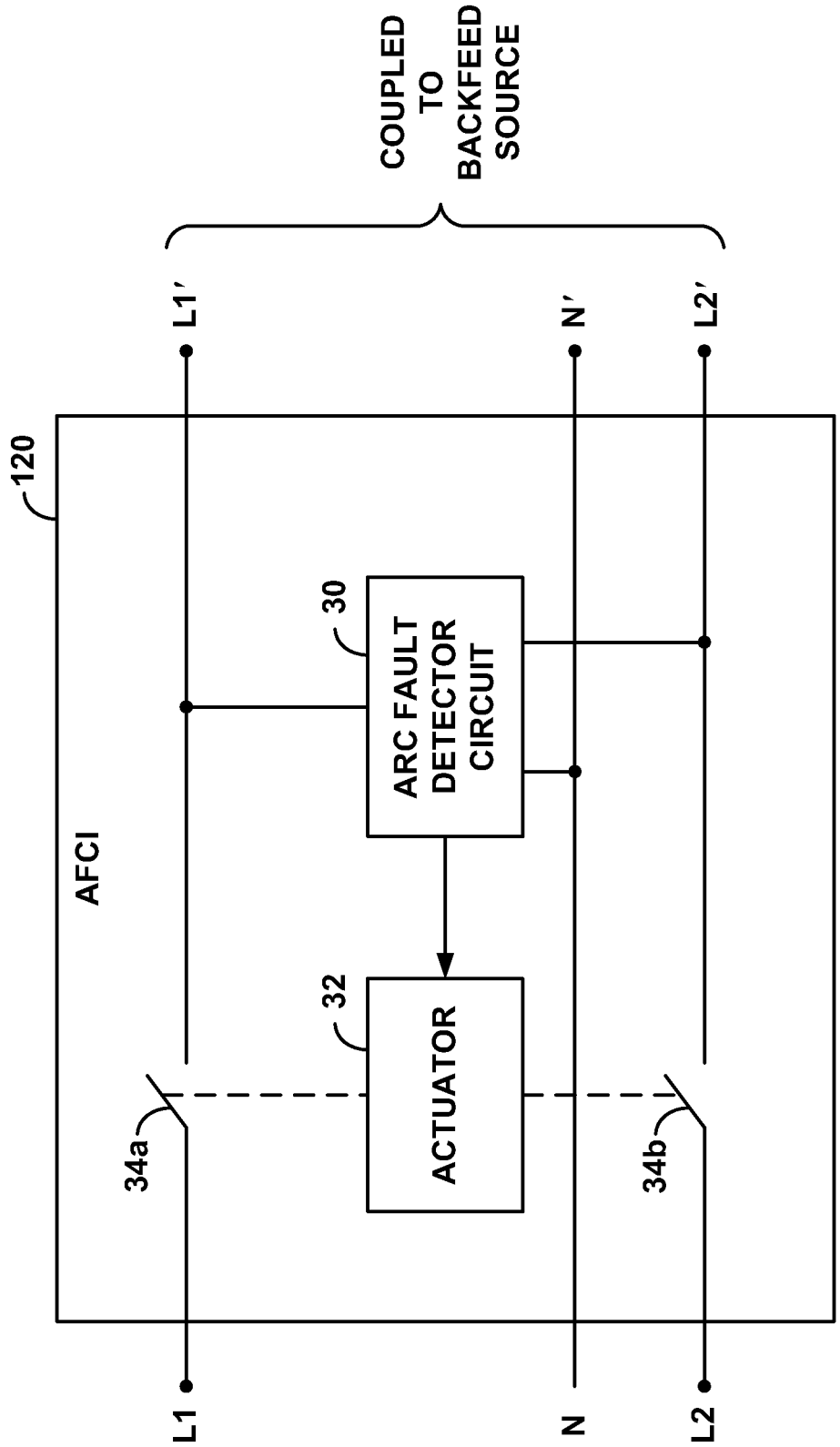
FIG. 5 is a block diagram of an example arc fault circuit interrupter device for use in systems in accordance with this invention.

Referring now to FIG. 5, an example AFCI 120 is described. AFCI 120 includes arc fault detector circuit 30, actuator 32 and switches 34a and 34b. Arc fault detector circuit 30 is coupled to load side terminals L1', N', and L2', and includes one or more circuits designed to detect signal characteristics of arc faults on terminals L1' and L2'. Although not shown in FIG. 5, arc fault detector circuit 30 also may include one or more circuits designed to detect ground faults between L1' and ground and L2' and ground.

Arc fault detector circuit 30 is coupled to actuator 32, which in turn is coupled to switches 34a and 34b. Switches 34a and 34b are normally closed, so that load side terminals L1' and L2' are coupled to line side terminals L1 and L2, respectively. If arc fault detector circuit 30 detects an arc fault (and/or a ground fault) on terminals L1', N' or L2', arc fault detector circuit 30 causes actuator 32 to open switches 34a and 34b to disconnect load side terminals L1' and L2' from line side terminals L1 and L2, respectively.

Actuator 32 may be a solenoid, electromagnet, motor, magnetically actuated circuit breaker component, or other similar device that may be used to open switches 34a and 34b in response to a signal from arc fault detector circuit 30 indicating that an arc fault (and/or a ground fault) has occurred.

Distributed generation sources that are designed for net-metering applications typically will include circuitry (sometimes called "anti-islanding" circuitry) that disconnects the distributed generation source from the electric utility voltage if the electric utility voltage drops below a predetermined value. This is a safety measure to prevent the distributed generation source from driving the electric utility power lines (and potentially injuring utility workers) in the event of a power failure. The disconnect is typically required to occur within a specified time (e.g., between about 50 ms and about 1500 ms) after loss of utility supply voltage, and is dependent upon system frequency and amperage.

Thus, if line side terminals L1, N and L2 in FIG. 5 are coupled to an electric utility voltage source, and load side terminals L1', N and L2' are coupled to L1", N", and L2" terminals of AC current source 20, if arc fault detector circuit 30 detects an arc fault (and/or a ground fault) on terminals L1' or L2', actuator 32 will cause switches 34a and 34b to disconnect the utility supply from AC current source 20. This in turn will trigger the anti-islanding circuits in AC current source 20 to disconnect AC current source 20 from load side terminals L1', N and L2' of AFCI 120.

Until the disconnect occurs, however, actuator 32 will remain energized at full load. Thus, to prevent damage to AFCI 120, actuator 32 should be able to operate at full load until the anti-islanding circuitry in AC current source 20 disconnects AC current source 20 from load side terminals L1', N and L2' of AFCI 120. For example, actuator 32 should be able to operate at full load for about 250 to about 1500 ms without failure, and should be appropriately matched to the disconnect time of the distributed generation source.

As an alternative to making the solenoid able to operate at full load, it is also viable to pulse width modulate the signal to the actuator, switch the driving electronics from full-wave rectified to half-wave rectified, or to enable the actuator with a time limited square wave.

Figure 6A:
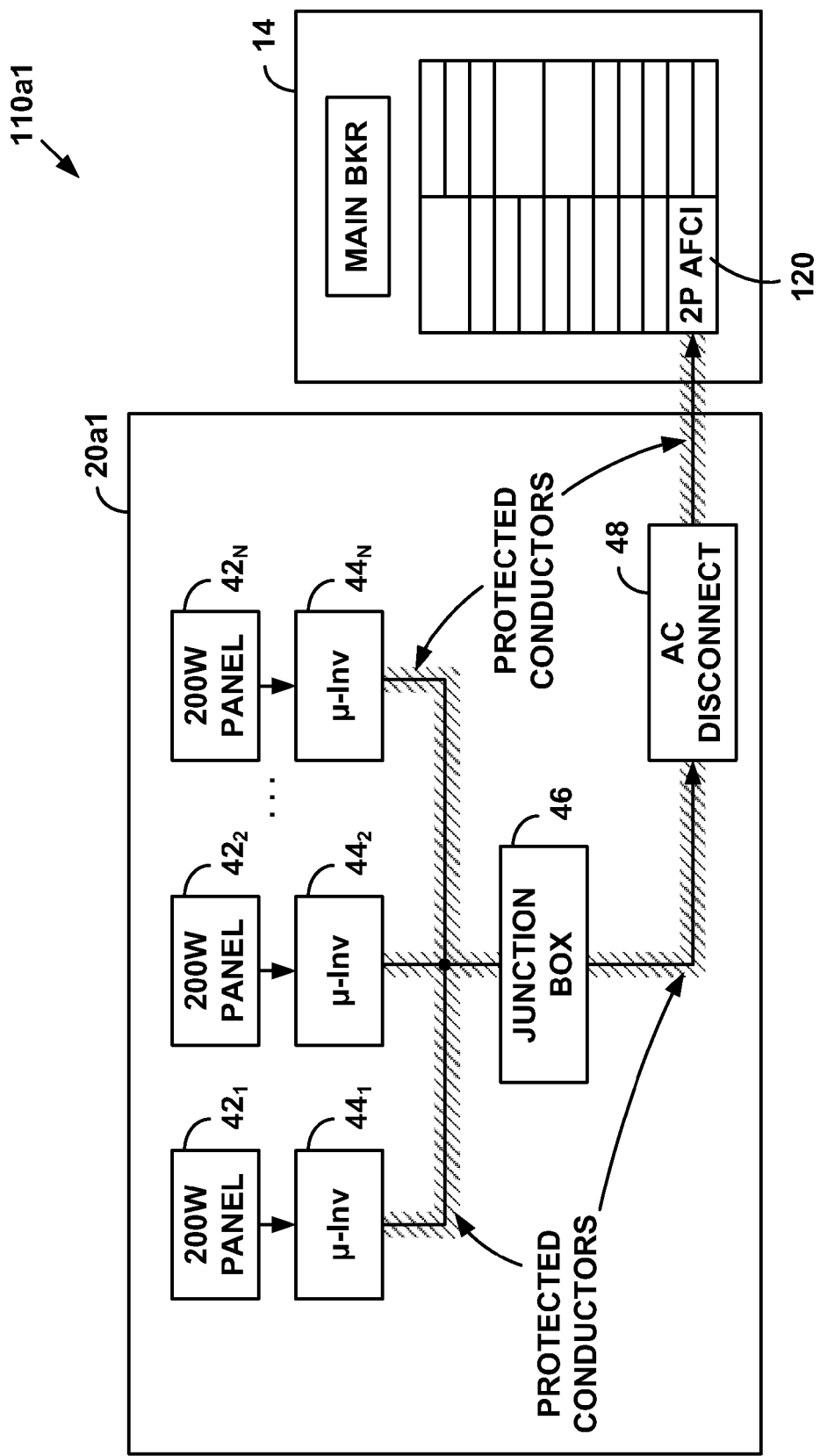
FIG. 6A is a block diagram of an example photovoltaic system including a back-fed arc fault circuit interrupter device in accordance with this invention.
Figure 6B:
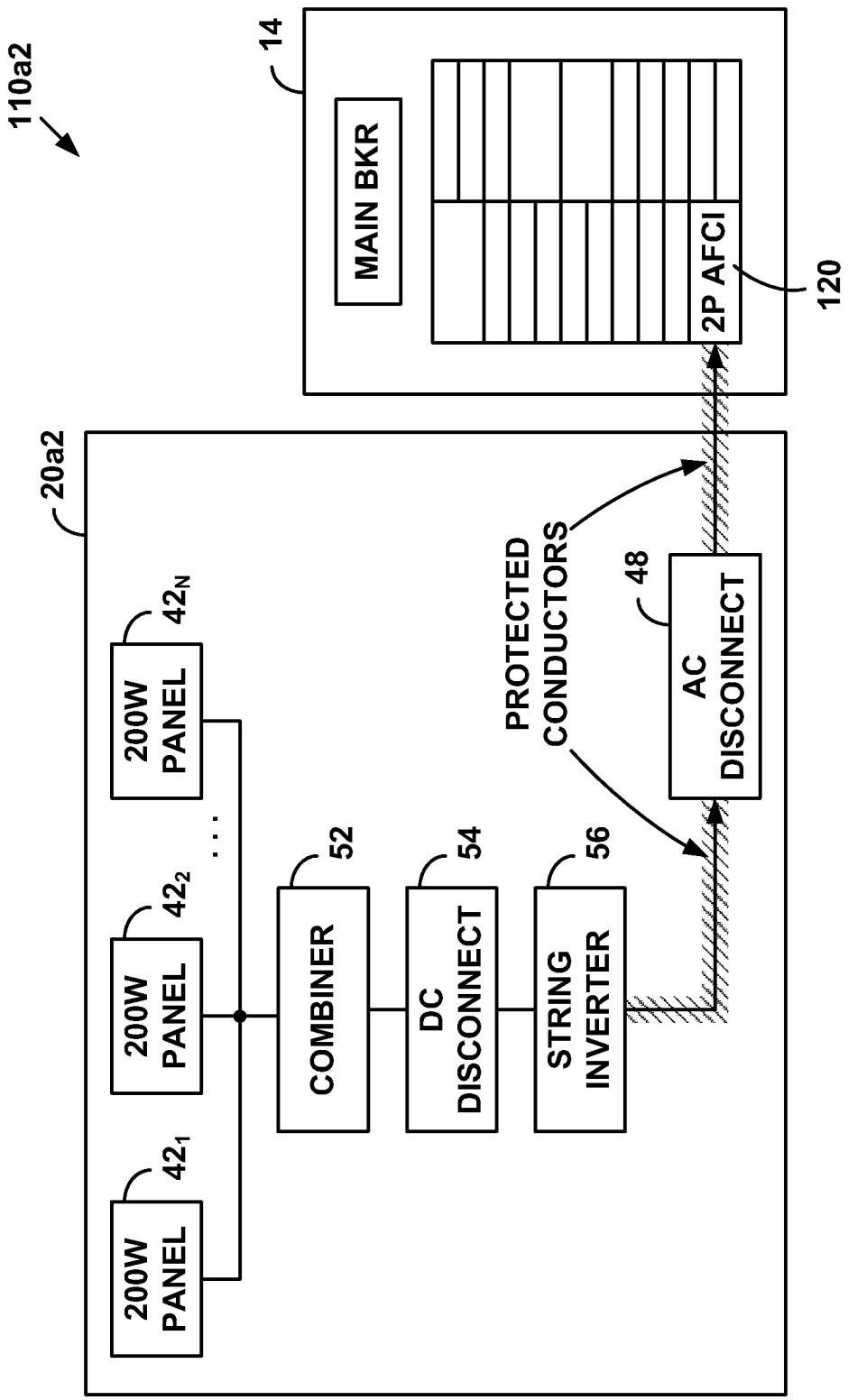
FIG. 6B is a block diagram of an alternative example photovoltaic system including a back-fed arc fault circuit interrupter device in accordance with this invention.

As described above, systems and methods in accordance with this invention may be used with a variety of different distributed generation sources, such as photovoltaic systems. Referring now to FIGS. 6A and 6b, two example photovoltaic systems in accordance with this invention are described.

FIG. 6A illustrates an example system 110a1 that includes AFCI 120 installed in circuit breaker panel 14, with a photovoltaic system 20a1 back-feeding AFCI 120. Photovoltaic system 20a1 includes multiple photovoltaic panels $42_1$, $42_2$, ..., $42_N$, each of which is coupled to a corresponding micro-inverter $44_1$, $44_2$, ..., $44_N$. Each micro-inverter $44_1$, $44_2$, ..., $44_N$ converts DC current supplied by the corresponding photovoltaic panels $42_1$, $42_2$, ..., $42_N$, to AC current, which are combined at junction box 46. Photovoltaic panels $42_1$, $42_2$, ..., $42_N$, micro-inverters $44_1$, $44_2$, ..., $44_N$ and junction box 46 may be located in a remote location (e.g., on a roof of a house).

The output of junction box 46 feeds AC disconnect switch 48, which may be mounted on the outside of a building or a home. The output of AC disconnect 48 back-feeds AFCI 120. As illustrated in FIG. 6A, AFCI 120 provides arc fault (and/or ground fault) protection to the conductors shown in cross-hatch.

Referring now to FIG. 6B, an alternative photovoltaic system in accordance with this invention is described. In particular, FIG. 6B illustrates an example system 110a2 that includes AFCI 120 installed in circuit breaker panel 14, with a photovoltaic system 20a2 back-feeding AFCI 120.

Photovoltaic system 20a2 includes multiple photovoltaic panels $42_1$, $42_2$, ..., $42_N$, each of which is coupled to a combiner 52. Combiner 52 combines the DC currents supplied by the photovoltaic panels $42_1$, $42_2$, ..., $42_N$, and the combined DC signal is coupled via DC disconnect 54 to string inverter 56, which converts the DC input signal to an AC current. Photovoltaic panels $42_1$, $42_2$, ..., $42_N$, combiner 52, DC disconnect 54 and string inverter 56 may be located in a remote location (e.g., on a roof of a house).

The output of string inverter 56 feeds AC disconnect switch 48, which may be mounted on the outside of a building or a home. The output of AC disconnect 48 back-feeds AFCI 120. As illustrated in FIG. 6B, AFCI 120 provides arc fault (and/or ground fault) protection to the conductors shown in cross-hatch.

The foregoing merely illustrates the principles of this invention, and various modifications can be made by persons of ordinary skill in the art without departing from the scope and spirit of this invention.

The invention claimed is:

1. A system comprising:
    an arc fault circuit interrupter ("AFCI") comprising a line side terminal, a load side terminal, and an actuator coupled to the line side terminal and the load side terminal, wherein the line side terminal is coupled to a voltage source; and
    a current source coupled to the load side terminal to back-feed the AFCI, the current source comprising circuitry for disconnecting the current source from the AFCI in response to a voltage source voltage dropping below a predetermined value, the current source having a disconnect time; wherein:
    the actuator is adapted to operate at full load during the disconnect time in response to the actuator causing the line side terminal to be disconnected from the load side terminal.

2. The system of claim 1, wherein the AFCI comprises:
    a switch coupled between the line side terminal and the load side terminal and coupled to the actuator; and
    an arc fault detector circuit coupled to the actuator, wherein:
    if the arc fault detector circuit detects an arc fault on the load side terminal, the arc fault detector circuit causes the actuator to open the switch to disconnect the line side terminal from the load side terminal.

3. The system of claim 1, wherein the AFCI comprises a single-pole AFCI.

4. The system of claim 1, wherein the AFCI comprises a two-pole AFCI.

5. The system of claim 1, wherein the voltage source comprises an electric utility voltage source.

6. The system of claim 1, wherein the actuator is adapted to operate at full load for 250 to 1500 milliseconds during the disconnect time.

7. The system of claim 1, wherein the line side terminal comprises a line terminal, a neutral terminal and a ground terminal.

8. The system of claim 1, wherein the line side terminal comprises a first line terminal, a second line terminal, a neutral terminal and a ground terminal.

9. The system of claim 1, wherein the current source comprises one or more of a photovoltaic system, a wind turbine system, a hydroelectric system, and a current source generator.

10. The system of claim 1, wherein the current source comprises a photovoltaic system that includes a string inverter.

11. The system of claim 1, wherein the current source comprises a photovoltaic system that includes a plurality of micro-inverters.

12. The system of claim 1, wherein the current source comprises circuitry for phase synchronizing the current source to the electric utility voltage source.

13. A method comprising:
providing an arc fault circuit interrupter ("AFCI") comprising a line side terminal, a load side terminal, and an actuator coupled to the line side terminal and the load side terminal, wherein the line side terminal is coupled to a voltage source; and
coupling a current source to the load side terminal to backfeed the AFCI, the current source comprising circuitry for disconnecting the current source from the AFCI in response to a voltage source voltage dropping below a predetermined value, the current source having a disconnect time; wherein:
the actuator is adapted to operate at full load during the disconnect time in response to the actuator causing the line side terminal to be disconnected from the load side terminal.

14. The method of claim 13, wherein the AFCI comprises:
a switch coupled between the line side terminal and the load side terminal and coupled to the actuator; and
an arc fault detector circuit coupled to the actuator, wherein:
if the arc fault detector circuit detects an arc fault on the load side terminal, the arc fault detector circuit causes the actuator to open the switch to disconnect the line side terminal from the load side terminal.

15. The method of claim 13, wherein the AFCI comprises a single-pole AFCI.

16. The method of claim 13, wherein the AFCI comprises a two-pole AFCI.

17. The method of claim 13, wherein the voltage source comprises an electric utility voltage source.

18. The method of claim 13, wherein the actuator is adapted to operate at full load for 250 to 1500 milliseconds during the disconnect time.

19. The method of claim 13, wherein the line side terminal comprises a line terminal, a neutral terminal and a ground terminal.

20. The method of claim 13, wherein the line side terminal comprises a first line terminal, a second line terminal, a neutral terminal and a ground terminal.

21. The method of claim 13, wherein the current source comprises one or more of a photovoltaic system, a wind turbine system, a hydroelectric system, and a current source generator.

22. The method of claim 13, wherein the current source comprises a photovoltaic system that includes a string inverter.

23. The method of claim 13, wherein the current source comprises a photovoltaic system that includes a plurality of micro-inverters.

24. The method of claim 13, wherein the current source comprises circuitry for phase synchronizing the current source to the electric utility voltage source.

25. A photovoltaic system comprising:
an arc fault circuit interrupter ("AFCI") comprising a line side terminal, a load side terminal, and an actuator coupled to the line side terminal and the load side terminal, wherein the line side terminal is coupled to a voltage source; and
an inverter coupled to the load side terminal to backfeed the AFCI, the inverter comprising circuitry for disconnecting the inverter from the AFCI in response to a voltage source voltage dropping below a predetermined value, the inverter having a disconnect time; wherein:
the actuator is adapted to operate at full load during the disconnect time in response to the actuator causing the line side terminal to be disconnected from the load side terminal.

26. The system of claim 25, wherein the AFCI comprises:
a switch coupled between the line side terminal and the load side terminal and coupled to the actuator; and
an arc fault detector circuit coupled to the actuator, wherein:
if the arc fault detector circuit detects an arc fault on the load side terminal, the arc fault detector circuit causes the actuator to open the switch to disconnect the line side terminal from the load side terminal.

27. The system of claim 25, wherein the AFCI comprises a single-pole AFCI.

28. The system of claim 25, wherein the AFCI comprises a two-pole AFCI.

29. The system of claim 25, wherein the voltage source comprises an electric utility voltage source.

30. The system of claim 25, wherein the actuator is adapted to operate at full load for 250 to 1500 milliseconds during the disconnect time.

31. The system of claim 25, wherein the line side terminal comprises a line terminal, a neutral terminal and a ground terminal.

32. The system of claim 25, wherein the line side terminal comprises a first line terminal, a second line terminal, a neutral terminal and a ground terminal.

33. The system of claim 25, wherein the inverter comprises a string inverter.

34. The system of claim 25, wherein the inverter comprises a plurality of micro-inverters.

35. The system of claim 25, wherein the inverter comprises circuitry for phase synchronizing an output of the inverter to the electric utility voltage source.

* * * * *